June 20, 1967  N. A. MURPHY ETAL  3,326,656
MANUFACTURE OF LEAD GLASSES
Filed April 30, 1964  2 Sheets-Sheet 2
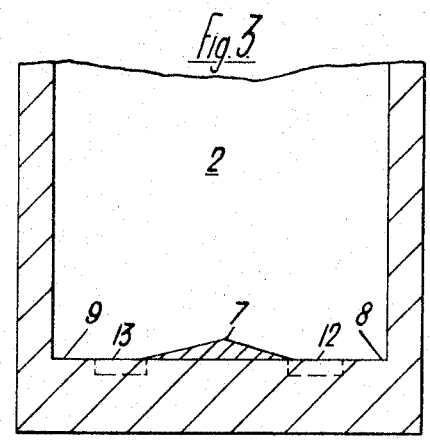
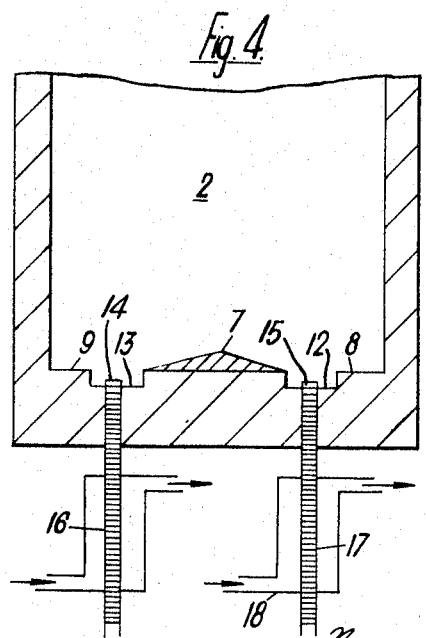

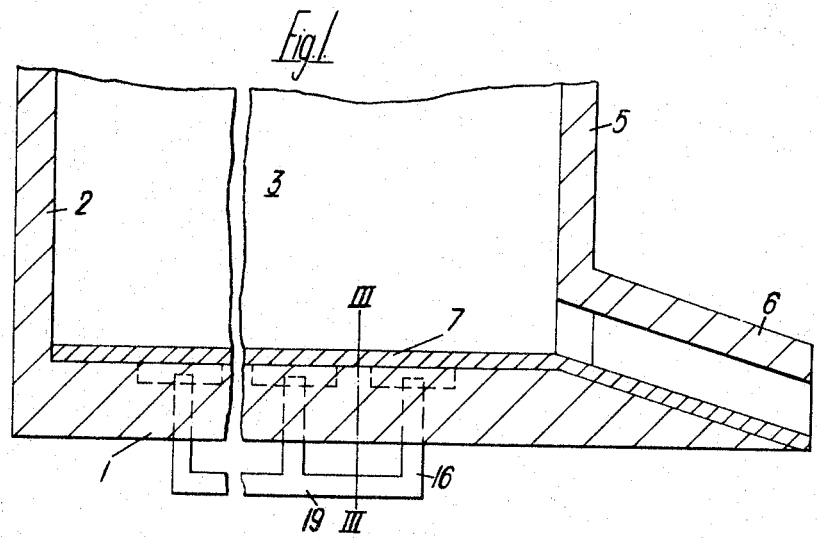
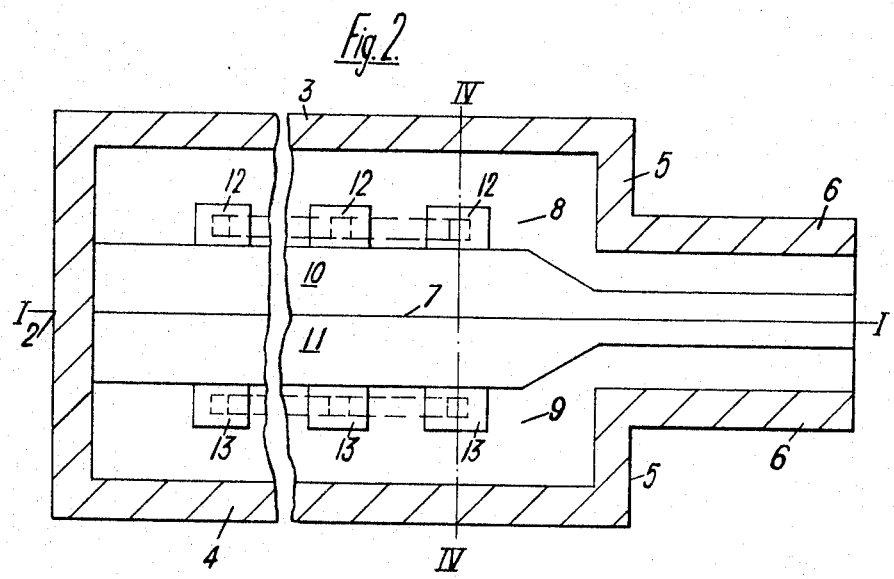

United States Patent Office 3,326,656
Patented June 20, 1967

3,326,656
MANUFACTURE OF LEAD GLASSES
Norman Aidan Murphy, Woolton, Liverpool, and William Edward Baybutt, Lathom, Ormskirk, England, assignors to Pilkington Brothers Limited, Liverpool, England, a corporation of Great Britain
Filed Apr. 30, 1964, Ser. No. 363,907
Claims priority, application Great Britain, May 2, 1963, 17,452/63
4 Claims. (Cl. 65—134)

This invention relates to the manufacture of lead glasses.

In the melting of lead glasses by Joule effect whether banks of electrode pairs of different electric potentials are used, or one or more pairs of electrodes are used to boost a melting process, reducing conditions can arise which cause metallic lead to separate from the molten glass which lead by reason of its higher specific gravity settles on to the floor of the melting furnace.

This lead settling on the floor of the furnace may form a metallic conducting path for the current between the banks of electrodes at different electric potentials so that the molten glass will carry little or no current.

The main object of the present invention is to prevent formation, during the melting process, of sufficiently dense aggregations of lead between a pair of electrodes at different potentials to constitute a metallic electrically conducting path across the floor of the furnace between the electrodes.

In accordance with the present invention a method of melting lead glasses in a melting furnace involving the use of a pair of electrodes entering the furnace and at different electric potentials to heat the glass in the furnace is characterized by imposing a gravitational flow on any accumulation of metallic lead which has settled out of the molten glass on to the floor of the furnace between the electrodes thereby continuously preventing the formation of an electrically conducting path of metallic lead across the floor of the furnace between the electrodes.

By the present invention any elongated aggregation of the metallic lead tending to create an electrically conducting path across the floor of the furnace between a pair of electrodes at different potentials is interrupted so that the intended flow of current through the molten glass is maintained during the melting process.

The precipitated metallic lead settling out of the molten glass may be utilised for extending the effective area of the bases of the electrodes and accordingly the present invention comprises the further step of collecting in the vicinity of the bases of the electrodes, the metallic lead migrating in the area between the electrodes.

The present invention also comprises a glass melting furnace suitable for melting lead glasses and having at least one pair of electrodes at different electric potentials entering the furnace characterized in that the floor of the furnace below the shortest path through the glass between each pair of electrodes at different electric potentials slopes away from an area between the electrodes in each direction downwardly and outwardly in a direction towards the side walls of the furnace, one slope being at least at an angle greater than the angle of repose of the metallic lead on the floor of the furnace.

Preferably a definite ridge is formed lengthwise of the floor of the furnace to provide a nonresident area for the metallic lead.

The present invention also comprises a melting furnace suitable for melting lead glasses and having at least one pair of electrodes at different electric potentials entering the floor of the furnace, characterized in that the floor of the furnace midway between each electrode pair is provided with a ridge at the junction of two similar downward slopes extending from the ridge to the outer areas of the furnace floor where the bases of the electrodes are presented to the molten glass.

Preferably, in accordance with the invention the floor of the furnace is formed with sumps in the vicinity of the electrode bases and the precipitated lead is collected in the sumps.

From this aspect the floor of the furnace constructed according to the present invention may include a central ridge uniformly sloping downwards towards plane outer areas of the floor in which outer areas the bases of the electrodes are presented to the molten glass and the electrode bases are mounted in the bottom of a sump.

In order that the invention may be more clearly understood a preferred embodiment thereof will now be described, by way of example, with reference to the accompanying diagrammatic drawings in which:

FIGURE 1 is a central sectional elevation taken on the line I—I of FIGURE 2 of a melting furnace, FIGURE 2 is a plan view of the floor of the furnace, FIGURE 3 is a sectional elevation on the line III—III of FIGURE 1, and FIGURE 4 is a transverse sectional elevation taken on the line IV—IV of FIGURE 2.

In the drawings like references designate the same parts. Referring to the drawings:

The melting tank comprises a floor 1 and four walls 2, 3, 4 and 5, and a discharge canal 6 projecting from the wall 5.

In the construction shown the floor comprises a central ridge 7 and outer plane areas 8, 9 connected to the ridge by similar slopes 10, 11, and the plane areas 8, 9 are formed each with a line of sumps 12, 13 into which sumps are respectively mounted the bases 14, 15 of two banks of electrodes 16, 17.

By such floor construction any metallic lead settling onto the slopes 10, 11 migrates through the force of gravity to the two lines of sumps 12, 13 where the precipitated metallic lead is collected in the vicinity of the bases of the electrodes 16, 17.

There may also be provided draining pipes extending from each sump through the walls or the floor of the furnace and provided with taps, so that when a substantial accumulation of lead has been collected in the sumps the lead may be drained off through the draning pipes by opening the taps.

The ridge 7 provides an area in the furnace floor between electrode pairs at different potentials on which deposited lead cannot rest. Accordingly, any linear path of lead across the floor is continually interrupted at the ridge and thus the flow of current between the electrodes via a path of metallic lead is obstructed.

From another aspect it can be stated that the possibility of the formation of a continuous metallic path across the floor between the sumps 12, 13 is avoided, and thereby the desired flow of current through the molten glass from one bank of electrodes to the other is maintained and an efficient melting operation achieved in spite of the continual settling out of metallic lead.

As indicated at 18 in FIGURE 4 each electrode such as 16, 17 may be water cooled and preferably, as indicated in FIGURE 1 when the electrodes are arranged in banks each bank may be electrically connected in parallel by a bus bar 19.

In a modified arrangement draining grooves may be formed on the slopes 10, 11 from just below the ridge 7 to the vicinity of the sumps, to assist in the movement of the lead particles to the sumps.

As will be readily understood, the steepness of the slopes which meet at the ridge ensures the existence of an area of the furnace floor between the electrodes on which metallic lead cannot achieve a residence time sufficient to permit a metallic conducting path between any electrode pair at different potentials to be formed, and that the ridge can be formed out of symmetry unless it is desired to divert the general flow of the migration of the particles into the vicinity of the electrode bases, and that though in the particular embodiment described the invention is employed between banks of electrodes by providing a medial ridge running lengthwise of the floor between the electrodes, the invention is equally advantageous on a floor of a melting furnace for lead glasses where one pair of electrodes is utilised to boost the melting process effected in the furnace.

In the foregoing description reference is made to the floor formation between electrodes entering the floor to the furnace, but the invention could with equal advantage be applied to a furnace where the electrodes enter the furnace walls.

Accordingly, the present invention comprises the employment of the floor formation as herein described between electrodes entering opposite walls of the furnace near the floor thereof.

We claim:

1. A glass melting furnace suitable for melting lead glasses and having at least one pair of electrodes at different electric potentials entering the furnace, characterized in that the floor of the furnace below the shortest path through the glass between each pair of electrodes at different electric potentials is in the form of a ridge with side walls sloping away from the crest of the ridge between the electrodes in each direction downwardly and outwardly in directions towards the side walls of the furnace, each sloping wall being at least at an angle greater than the angle of repose of the metallic lead on the floor of the furnace, said crest presenting no horizontal supporting surface of any substantial width between said sloping walls on which any substantial amount of metallic lead which may settle out of the molten glass onto said floor can collect.

2. A glass melting furnace according to claim 1, wherein the ridge in the floor of the furnace is provided midway between each electrode pair at the junction of two similar downward slopes extending from the crest of the ridge to the outer areas of the furnace floor where the bases of the electrodes are presented to the molten glass.

3. A method of melting lead glasses in a melting furnace, wherein said furnace has a pair of spaced electrodes entering the furnace at different electrical potentials to heat the glass in the furnace and has also a floor with a region defining a shunting path between said electrodes, and wherein reducing conditions cause metallic lead to separate from the molten glass and to settle on said floor, said method comprising the step of drawing off continuously and slopingly by the action of gravity out of shunting relationship with said electrodes, any accumulation of metallic lead which has settled out of the molten glass onto said floor region, and conducting said lead to a region of the floor which does not define a shunting path between said electrodes, thereby continuously preventing the formation of an electrically conducting path of metallic lead across the floor of the floor between the electrodes.

4. A method as described in claim 3, comprising the step of collecting the drawn off metallic lead conducted to the last mentioned floor region in the vicinity of the bases of the electrodes.

References Cited

UNITED STATES PATENTS 1,069,255    8/1913    Heroult _____ 13—6

DONALL H. SYLVESTER, *Primary Examiner.*

S. LEON BASHORE, G. R. MYERS,
                             *Assistant Examiners.*